United States Patent [19]
Jennings et al.

[11] 3,742,673
[45] July 3, 1973

[54] PANEL EDGE FASTENING MEANS

[75] Inventors: Paul Jennings, Corona Del Mar; Delmar S. Miller, Newport Beach, both of Calif.

[73] Assignee: Rex Chainbelt Inc., Milwaukee, Wis.

[22] Filed: Mar. 22, 1971

[21] Appl. No.: 126,662

[52] U.S. Cl............... 52/624, 52/511, 52/512, 52/617
[51] Int. Cl............................................ E04c 2/36
[58] Field of Search.................... 52/462, 511, 512, 52/624, 303, 506, 617, 309, 620, 621, 366, 587, 372–374; 264/274

[56] References Cited
UNITED STATES PATENTS

| | | | |
|---|---|---|---|
| 2,664,596 | 1/1954 | Greig | 52/621 |
| 3,016,578 | 1/1962 | Rohe | 264/274 |
| 2,140,709 | 12/1938 | Mauser | 52/617 |
| 2,607,447 | 8/1952 | Tuttle | 52/617 |
| 2,967,593 | 1/1961 | Cushman | 52/617 |
| 3,041,912 | 7/1962 | Kreider et al. | 52/617 |
| 3,300,928 | 1/1967 | Keller | 52/624 |
| 3,350,832 | 11/1967 | Persson | 52/506 |
| 3,526,031 | 9/1970 | Truitt | 52/624 |

FOREIGN PATENTS OR APPLICATIONS

| | | | |
|---|---|---|---|
| 861,884 | 3/1961 | Great Britain | 52/617 |
| 1,084,009 | 6/1960 | Germany | 52/309 |

Primary Examiner—Frank L. Abbott
Assistant Examiner—Leslie A. Braun
Attorney—Ernst W. Schultz and Joseph J. Jochman, Jr.

[57] ABSTRACT

A number of panel edge fasteners for lightweight sandwich panels are adjustably mounted along a channel member and the member is inserted into and closes out the open panel edge. A pair of holes in the overlying panel skins is aligned with each selectively positioned fastener, and a pair of plugs pressed into recesses in the fastener clamps the panel skins therebetween. Void space between the lightweight panel core and the channel and attached fasteners may be filled with a foam adhesive.

6 Claims, 6 Drawing Figures

PATENTED JUL 3 1973 3,742,673
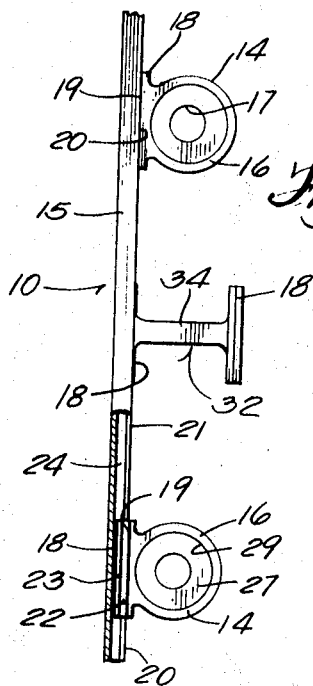
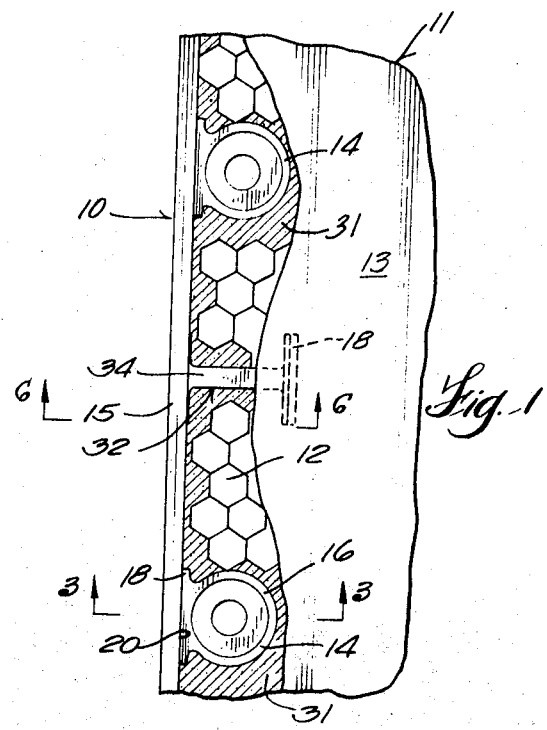
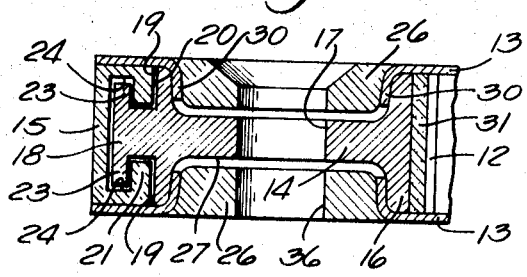
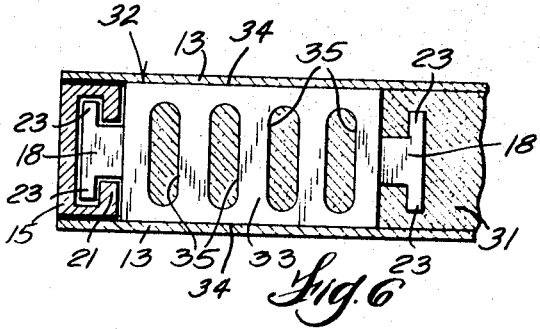
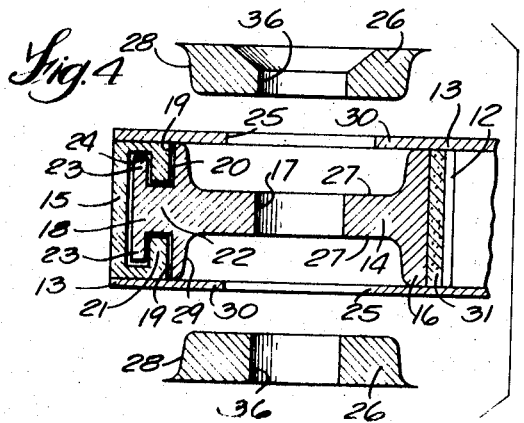
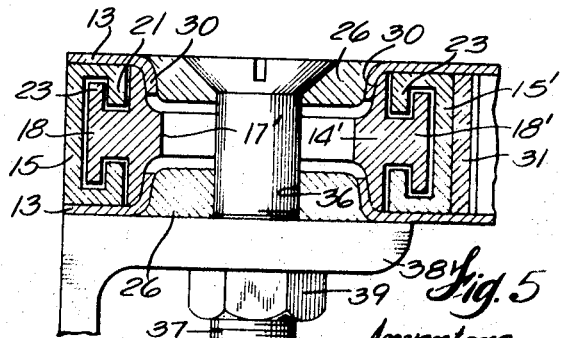
Inventors
Paul Jennings
Delmar S. Miller
By Joseph G. Gochman Jr.
Attorney

PANEL EDGE FASTENING MEANS

BACKGROUND OF THE INVENTION

1. Field of the Invention.

The present invention pertains to the art of fasteners for lightweight sandwich panels and, more particularly, to a means for combined edge fastener insert mounting and panel edge close out.

2. Description of the Prior Art.

Lightweight sandwich panel construction is well known in the art and, because of its inherent high strength-to-weight ratio, a principal use of sandwich paneling is in the aircraft industry. In the construction of aircraft, sandwich panels may be used for fuselages and for interior floors and walls.

The joining of sandwich panel sections or their attachment to structural members requires special fastening means peculiar to this type of construction material. Sandwich paneling comprises two thin sheets, generally of metal, between which is sandwiched and bonded a low density core. It is known that the outer thin sheets or skins are the primary load carrying elements of the panel structure and that the lightweight core material acts principally as a stabilizer and carries little of the load. The fasteners used with sandwich panels are thus designed to be secured to one or both panel skins and to transmit the load directly thereto.

Prior art sandwich panel fasteners are generally of either of two basic types. One type is inserted into a cored-out portion of the interior of the panel through a single hole in one of the skin sheets, and is held in place or "molded-in" with an adhesive filler. A typical example is shown in U.S. Pat. No. 3,016,578. The other type may be broadly characterized as a through fastener. This type is adapted to interconnect the skin sheets and may be clamped or otherwise attached to one or both skins, as shown, for example, in U.S. Pat. No. 2,967,593.

The purpose of the sandwich panel fastener is to provide means for the attachment of panel sections to one another or to structural members. To facilitate such attachment, the fasteners may be provided with a blind threaded bore or a through bore for threaded or riveted connection.

Regardless of the type of prior art fastener, the manner in which it is installed, or the attachment means used to mount the panel, each fastener acts independently in the sense that the load imposed on it is transmitted directly to the sandwich panel in which it is mounted. Since the skin sheets carry most of the load transmitted to the panel and are very thin relative to overall panel thickness, it is extremely important that loads imposed on a panel section be distributed through an adequate number of fasteners. However, even though a fastener grouping may be adequate to handle a reasonably evenly applied design load, in many applications localized unbalanced loading makes such a grouping of individual fasteners highly unsatisfactory.

A particularly critical situation involves fastening or attaching a sandwich panel at or near one of its edges. The open panel edge is its weakest area and, besides maintaining a substantial edge distance for the installation of prior art fasteners, the exposed interior honeycomb or other low density core material must be sealed in and the edges of the skin sheets supported with a sealing or "close-out" member.

SUMMARY OF THE INVENTION

The present invention provides a means for interconnecting a series of panel edge fasteners in a manner such that a load imposed on any one is distributed to the others through a common connector. The connector also serves as the panel edge close-out and the fasteners may be adjustably attached thereto to provide any desired spacing.

The fasteners are fixed at the spacing selected and secured to the panel skins by clamping means, and the entire assembly of the close-out and fasteners may be bonded to the inner surfaces of the panel skins and to the core material with a suitable adhesive.

The interconnection of the fastener elements increases the load capacity of each fastener such that a substantial reduction in the number of fasteners required may be made. The direct attachment to and the additional support provided by the close-out and common connector allows the edge distance standard with prior art fasteners to be reduced substantially.

The present invention provides a means of increasing the strength of a panel mounting while reducing the weight of the mounting assembly, which is most important in the aircraft industry. In addition, the entire panel edge fastening assembly may be installed either at the time of panel fabrication or in an existing panel.

BRIEF DESCRIPTION OF THE DRAWING

FIG. 1 is a plan view of a portion of a honeycomb sandwich panel with a part of one panel skin sheet broken away showing the installation of a fastener assembly of the present invention.

FIG. 2 is a plan view of the close-out channel and fastener assembly shown in FIG. 1 with a portion of the channel broken away to show the slidable engagement of the fasteners therein.

FIG. 3 is an enlarged sectional view taken on line 3—3 of FIG. 1.

FIG. 4 is a sectional view similar to FIG. 3 but prior to dimpling of the skin sheets and insertion of the clamping plugs.

FIG. 5 is a sectional view through an assembly showing an alternate embodiment of the invention.

FIG. 6 is an enlarged sectional view taken on line 6—6 of FIG. 1.

DESCRIPTION OF THE PREFERRED EMBODIMENTS

Referring to the drawing, FIG. 1 shows a fastener mounting and close-out assembly 10 of the present invention mounted within the edge of a low density core sandwich panel 11. The low density core 12 of the panel shown comprises a lightweight honeycomb material and is sandwiched between two thin outer skin sheets 13, all in a manner well known in the art. The core 12 may be a honeycomb material of various types or other lightweight material and the skin sheets 13 are generally made of aluminum, although other suitable materials are also used in the art.

The panel edge fastener assembly 10 includes a series of fasteners 14 and a close-out channel member 15 which also serves as the mounting and load distribution means for the fasteners. Referring also to FIGS. 2 and 3, each fastener 14 includes a generally cylindrical body 16 with a circular through bore 17 for receipt of a bolt, screw, rivet, or the like for attachment of the panel 11 to other panels or structural members. An integral connector 18 extends from the body 16 for mounting on the close-out member 15.

The close-out member 15 comprises an elongated channel member of C-shaped cross section. The integral connector 18 of each fastener 14 is adapted to be slidably received in the end of the close-out 15. The connector 18 includes flat abutment portions 19 adapted to slidably engage the faces 20 of the inwardly depending legs 21 of the close-out member 15. A reduced neck 22 of the connector separates the abutment portions 19 and fits within the slot between the legs 21, and an expanded head 23 retains the fastener in the channel 24 defined by the C-shaped cross section.

A series of fasteners 14 may be mounted on the close-out member 15 and set at any desired spacing. A portion of the panel core 12 is removed to a shallow depth to provide for receipt of the close-out member 15, and to a greater depth at intervals corresponding to the desired fastener spacing for receipt of the fasteners. The sandwich panel skins 13 are provided with aligned holes 25 at each fastener location. The holes 25 allow final lateral adjustment of the positions of the fasteners and provide openings for the insertion of the clamping means and cooperating means for attaching the panel to another panel or structural member.

Referring particularly to FIGS. 3 and 4, the clamping means comprises a pair of circular plugs 26 which are adapted to be pressed into a pair of counterbored recesses 27 in the body 16 of each fastener and to clamp therebetween the margins 30 of the holes 25 in the panel skins. The clamping surfaces 28 of the plugs 26 and the walls 29 of the counterbored recesses 27 are preferably slightly tapered or inwardly convergent to provide a more positive clamping and locking. The thickness of the plugs 26 is less than the depth of the recesses 27 in the fastener in order to prevent bottoming of the plugs therein and possible loss of clamping effectiveness.

It has been found that the margins 30 of the aluminum skins must be dimpled after the close-out channel and fasteners are in place but prior to insertion of the plugs 26. The dimpling helps provide easier and more accurate installation of the plugs and prevents undesireable ruptures or breaks in the skin margins around the holes 25. The skin margins 30 are preferably dimpled to the point of contact with the walls 29 of the recessed portions 27 and the normal spring-back of the skin material is taken up by the insertion of the plugs. With some types of aluminum skin material hot dimpling at a temperature of about 600°F is required, while with other types heat may be used but is not required, all in a manner known in the art.

A substantial increase in strength may be obtained if the close-out and fastener assembly 10 is additionally bonded in place with a suitable adhesive. An adhesive of the various types known and used in the sandwich panel art is applied to all surfaces of the assembly which contact the inner surfaces of the panel skins. Additionally, the void space between the inner surfaces of the assembly 10 and the panel core 12 may also be filled with an adhesive filler 31, preferably prior to insertion of the assembly. A suitable filler has been found to be a polyureathane adhesive containing "syntactic" hollow thermoplastic or glass beads to form a lightweight foam adhesive.

The fastener assembly of the present invention is also very well suited for installation at the time of fabrication of the sandwiched panel. The assemblies 10 may be simply positioned along the edges of the core material 12 and a suitable adhesive applied to the panel skin contacting surfaces of both the core and fastener assemblies. The overlying panel skins 13 may be predrilled and the holes 25 used to locate the individual fasteners 14 along each channel member 15 after the skins are laid in position. With the fasteners in position, the entire panel is subjected to the heat and pressure which is standard for curing sandwich panels of this kind. If desired, the assembly could also be installed in the interior of the panel at the time of panel fabrication.

Because of the interconnection of the individual fasteners and the consequent distribution of the load on one to the others through the close-out channel, a substantial strength increase per fastener is attained. Tests have shown that for a given design load, the number of fasteners required with the close-out member of the invention herein is one-third the number of comparable individual prior art fasteners. As compared to the prior art, the fastener spacing in an assembly of the present invention may, therefore, be tripled. It is also at approximately this tripled spacing that the weight saving provided by the fastener assembly becomes apparent. The additional weight of the close-out member is negated by the reduction in the number of fasteners and their associated attachment bolts, brackets, etc.

The increased fastener spacing made possible by the present invention also increases the potential for detrimental panel buckling in some applications, particularly in flooring installations. To help prevent buckling and to provide an increase in panel edge strength generally, various strengthening means may be incorporated into the basic system previously described. One such strengthening or stiffening means is shown in FIG. 5 and is simply an additional C-shaped channel member 15' installed coextensively with the close-out member 15 and inwardly of the fasteners. A slightly modified fastener 14' may be used with this double channel installation. The modified fastener 14' is formed with an additional integral connector 18' for attachment to the channel member 15' in the same manner previously described. As shown in FIG. 5, the modified fastener is symmetrical and may be provided with a substantially enlarged bore 17' to in part compensate for the weight increase from the additional channel member 15'.

Another means of reinforcing the panel edge intermediate relatively widely spaced fasteners 14 is shown in FIG. 6. An edge support 32 has a rectangular body 33 and a pair of integral connectors 18 extending from opposite edges. The support 32 may be slidably attached to the close-out member 15 in the same manner as fasteners 14 or 14'. The support is dimensioned such that its narrow upper and lower surfaces 34 abut the inner faces of the panel skins 13 and provide a rigid support therebetween. The body 33 of the support may also be provided with slots or ports 35 to eliminate excess material and reduce the weight.

FIG. 5 shows one of the various attachment means which may be used to fasten the panel 11 to a structural member or another panel. The clamping plugs 26 are provided with circular bores 36 and one plug is additionally countersunk for receipt of a flathead screw 37. The panel is secured to a bracket 38 by the screw 37 and a nut 39, and an adjacent panel or other member may be likewise secured to the other leg of the bracket. It will be seen that the fastener 14 or 14' is spaced from the edge of the panel by a distance equal to the depth of the close-out member 15. This edge distance is substantially less than the distance of one full fastener body diameter which has been standard in the art for individually mounted fasteners. An important direct result of the reduced edge distance is a corresponding reduction in the length (and weight) of the bracket legs to which the panel is attached.

Variations in the fastener body 16 to accommodate other known fastening means and methods will be apparent to those skilled in the art. For example, an enlarged bore 17' (FIG. 5) may be adapted to hold a floating nut and the nut may be held in place by the plugs 26. In another embodiment the fastener body may be provided with a recess 27 on one face only and be clamped with a single plug 26. The fastener may be further adapted for either through or blind attachment in manners known in the art.

Tests have shown that an all aluminum closeout and fastener assembly provides the greatest strength. However, variations in which one or more of the basic components of the system are made of plastic have also been found to perform effectively. In lower load applications the weight saving provided by plastic components may make it more desireable.

What is claimed is:

1. Apparatus for mounting fasteners in a sandwich panel having a low density core between thin outer skin sheets comprising, a channel member adapted to be inserted in the edge of the panel between the inner surfaces of said skin sheets and to close-out the panel edge, fasteners slidably mounted on said channel member for variable spacing therealong and adapted to be inserted with said member between the skin sheets into an open panel core area, and clamping means attached from without the panel to secure each fastener to at least one of said skin sheets.

2. Apparatus as described in claim 1 wherein said fasteners are provided with recessed portions adjacent said skin sheets, said sheets are provided with openings concentric with and of lesser dimension than said recessed portions, and said clamping means comprises plugs adapted to be pressed into said recessed portions and to clamp the margins of the sheets defining said openings therebetween.

3. Apparatus as described in claim 2 wherein said recessed portions and said plugs are of circular form.

4. Apparatus as described in claim 3 wherein the skin contacting surfaces of said circular recessed portions and said plugs are frusto conical and inwardly convergent to effect a positive clamping of the skin therebetween.

5. Apparatus as described in claim 3 wherein each fastener is provided with two circular recessed portions such that plugs may be pressed into said recessed portions to secure each fastener to both skin sheets.

6. Apparatus as described in claim 5 wherein said fasteners and their corresponding plugs are concentrically through bored for receipt of panel attaching means.

* * * * *

UNITED STATES PATENT OFFICE
CERTIFICATE OF CORRECTION

Patent No. 3,742,673             Dated July 3, 1973

Inventor(s) Paul Jennings, et al.

It is certified that error appears in the above-identified patent and that said Letters Patent are hereby corrected as shown below:

On the cover sheet item [73] "Rex Chainbelt, Inc., Milwaukee, Wis." should read -- Rexnord Inc., Milwaukee, Wis. --.

Signed and sealed this 2nd day of April 1974.

(SEAL)
Attest:

EDWARD M. FLETCHER, JR.
Attesting Officer

C. MARSHALL DANN
Commissioner of Patents